Jan. 12, 1960
M. MILLER ET AL
2,920,352
PROCESS OF CASTING AND STRETCHING FILM
Filed April 23, 1954
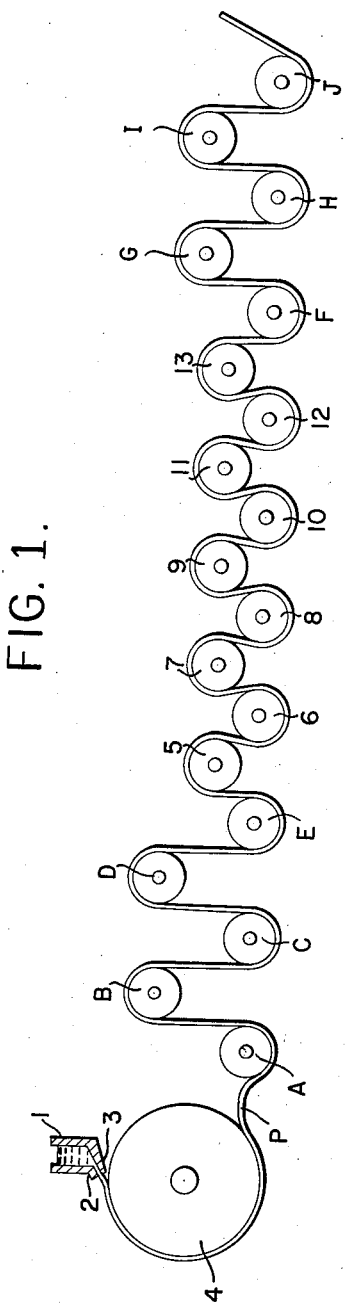
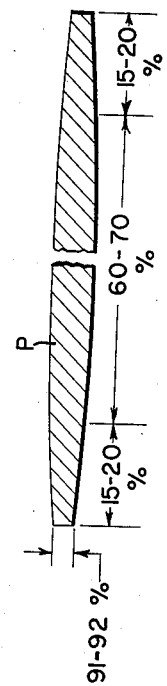
INVENTORS
Meredith Miller
Donald Ross McGregor
BY *R. Ralph Snyder*
ATTORNEY

United States Patent Office 2,920,352
Patented Jan. 12, 1960

2,920,352
PROCESS OF CASTING AND STRETCHING FILM

Meredith Miller, Grand Island, and Donald Ross McGregor, Kenmore, N.Y., assignors to E. I. du Pont de Nemours & Company, Wilmington, Del., a corporation of Delaware Application April 23, 1954, Serial No. 425,140

4 Claims. (Cl. 18—57)

This invention relates to a combined process of casting and stretching a polymeric film and, more particularly, to a process for the casting and the subsequent stretching of said film in the longitudinal direction, whereby to produce a stretched film of substantially uniform thickness.

Thermoplastic, normally crystalline, synthetic linear organic polymers, such as polyethylene terephthalate, exhibit in the unoriented state certain weaknesses which place these films at a disadvantage in competition with other types of films and fabrics. Reduced tensile strength, impact strength, flex life, and relatively high water vapor and organic vapor permeability are among these. By a process of drawing or stretching, i.e., elongating longitudinally and/or transversely, however, certain polymers undergo permanent changes in the molecular orientation thereof with accompanying improvements in the physical properties listed above.

One such procedure for the molecular orientation of organic linear polymers may be found in the longitudinal stretching of the film over differential speed rolls. In this process, the polymer, such as polyethylene terephthalate is extruded through a slot orifice, provided with adjustable lips to form a flat cast sheet. The film is then fed into a longitudinal stretching section composed of groups of horizontal, smooth plated polished rolls, disposed in parallel. The first series of rolls (slow rolls) is positively driven at a relatively slow surface speed. The next group of rolls consists of a series of idler rolls. The last group (fast rolls) is made up of positively driven rolls having much more rapid surface speed than the slow rolls. Thus, longitudinal tension or stretching action is exerted upon the film as the film passes from the slow moving rolls to the faster rolls. The use of idler rolls between the slow and fast rolls, here, aids in promoting uniform stretching of the film.

By virtue of the fact that the film is actually driving the idler rolls at the same time as it is being elongated longitudinally, the idler rolls are traveling at different speeds. That is, the first idler roll is traveling at about the same speed as the slow rolls. Intermediate idler rolls are traveling at intermediate differential speeds, and the film is stretched longitudinally as it passes from one idler roll to the next.

In longitudinal stretching of continuous films on differential speed rolls, the film, as it is elongated longitudinally, suffers a reduction in width, owing to transverse slippage upon the surface of the stretching rolls. This transverse slippage or "necking-in," which has been found to cause as much as 25% to 30% reduction of width in a cast-stretched film, is thought to be caused by lack of friction between the film edges and the smooth surface of the stretching rolls. Smooth surfaced, polished rolls are used since stretching of the polymeric material is carried out at elevated temperatures at which roughened surfaces impair the film surface. Some "necking-in," despite the close proximity of the idler rolls to one another, undoubtedly takes place during the transfer of the film from one roll to another; but the major reduction in film width takes place upon the roll surfaces owing to transverse slippage. This reduction in width not only may be excessively irregular, causing an objectional unevenness of width known as "scalloping," but may also cause an irregular variation in the thickness of the film at the edges. This edge thickening causes the caliper of the film at the edge portion to be more than appreciably thicker than that of the middle portions of the film.

An object of the present invention, therefore, is to provide a continuous process for the manufacture of a stretched thermoplastic, normally crystalline, synthetic linear polymer film having improved uniformity of thickness (gauge). A further object is to provide a stretched thermoplastic film having improved uniformity of thickness. A still further object is to provide a continuous process for the manufacture of stretched polyethylene terephthalate film of substantially uniform thickness. Other objects will appear more clearly from the description given hereinafter.

These objects are realized by the present invention which, briefly stated, comprises continuously casting (extruding) a thermoplastic, film-forming, synthetic linear organic polymeric material, e.g., polyethylene terephthalate, in the form of a symmetrical film having a tapered contour, and thereafter stretching the film longitudinally over differential speed rolls.

The expression "tapered contour," as used herein, signifies a symmetrical film cast in such manner that the cross-section of the center portion of the film, measured along the transverse direction, i.e., normal to the longitudinal axis of the film, will be of greater thickness than that of the edge portions. Preferably, the width of each of said edge portions of reduced thickness will constitute at least 15% of the total width of the film.

The process of the present invention is conveniently carried out by extruding a melt of thermoplastic synthetic linear polymeric material, e.g., substantially amorphous polyethylene terephthalate, through the lips of a conventional extrusion hopper, the lips being adjusted to lay down a film which has its maximum thickness at the center of the film, measured along the transverse axis of the film, and which tapers down to the edges of the film; and thereafter passing said film over differential speed rolls maintained at a surface temperature of from about 80° to about 90° C., to stretch the film in the longitudinal direction. Preferably, to achieve uniformity in thickness of a film stretched from 2 to 4 times its original length, the width of the tapered section at each edge of the cast film should constitute from 15% to 20% of the total width of the film; and the thickness of the cast film at the edges should be from about 91% to 92% of the maximum thickness of the film at the center portion thereof. This difference between edge thickness and center thickness of the tapered contour (as cast) film is normal when the neck-in (or loss in width) of the film during longitudinal stretching is no greater than about 10%–15%. When neck-in during longitudinal stretching is greater than about 15%, this depending upon the rate of stretch, temperature of the rolls, thickness of the film, etc., the edges of the film must be cast proportionally thinner than 8%–9% thinner than the center of the film.

Although the process of the invention is described herein with specific reference to the preferred polymeric material, namely, polyethylene terephthalate, it is understood that the invention comprehends treatment of all thermoplastic, film- and fiber-forming, synthetic linear polymers including polyamides, e.g., polyhexamethylene adipamide, polyhexamethylene sebacamide, polycaproamide, and other types described in United States Patents Nos. 2,071,250 and 2,071,253; vinylidene chloride;

rubber hydrochloride; polystyrene; and other various polymeric materials which are useful in film form.

The invention will be more fully described with reference to the accompanying drawings wherein:

Figure 1 is a schematic view of an arrangement of apparatus for carrying out the process of this invention, and Figure 2 is a fragmentary cross-section taken transversely of the film showing the tapered contour of the cast sheet in accordance with this invention.

Referring to the drawings, molten, synthetic, thermoplastic film-forming material, e.g., polyethylene terephthalate, is extruded from an extrusion hopper provided with adjustable hopper lips 2 and 3. After extrusion, the polymer is then cast onto the surface of the conventional, positively driven quenching drum 4. From the quenching drum, the film P is fed into a longitudinal stretching section composed of three groups of horizontal, chromium plated, polished rolls, disposed in parallel. The first group of five, A–E, inclusive (slow rolls), are positively driven and are internally heated so that the surfaces are at a temperature between 80° and 90° C. The next group of nine, 1–9, inclusive, are idler rolls heated to the same temperature. The last group of five, F–J, inclusive (fast rolls), are positively driven and are heated to 80–90° C. Each roll is 30" wide by 4½" outside diameter. Preferably, the adjustable hopper lips 2 and 3 are so adjusted that the film laid down on the quenching drum has a contour such as is illustrated in Figure 2.

The following specific examples further illustrate the principles and practice of the process of the invention.

EXAMPLE 1

Amorphous polymeric polyethylene glycol terephthalate prepared by ester exchange between dimethyl terephthalate and ethylene glycol in accordance with the general procedure described in United States Patent No. 2,465,319, issued to Whinfield and Dickson, was extruded through an extrusion hopper as hereinbefore described. Two separate runs were made. In both cases, the hopper lips were adjusted so as to form a film of amorphous polymer 19¼" in width and 0.075" in thickness. This refers in the case of the tapered-edge contoured film, of course, to the thickness at the center. In the first case, the lips were adjusted so as to form a film having tapered edges. Here the distance between the hopper lips at the center of the slot orifice was greater than the distance between the hopper lips at each end. Thus (see Figure 2), a symmetrical sheet was formed having edge portions which were 8%–9% thinner than the center portion. Generally, the center portion of the sheet having a tapered contour constitutes from 60%–70% of the total width of the sheet; and each edge portion constitutes from 15%–20% of the sheet. The film in the second run was cast in the conventional manner, with a substantially flat-cast sheet being produced. Both runs were processed identically after extrusion. After quenching, the films were fed into the longitudinal stretching apparatus described above (see Figure 1) and stretched to three times (3×) their original length on rolls maintained at a temperature between 80° and 90° C. The slow rolls were positively driven at a speed of 5.3 yards per minute, and the fast rolls were driven at a speed of 16 yards per minute. The distance between adjacent slow rolls and adjacent fast rolls was 4". The distance between the circumferences of the last slow roll and the first idler roll, the last idler roll and the first fast roll, and between adjacent idler rolls was 0.080". During this longitudinal stretching step under these conditions, the film was reduced in width (owing to neck-in) by about 14%.

The final step in the process constituted stretching both films 3× in the transverse direction in an enclosed tentering apparatus wherein the temperature of the atmosphere surrounding the film was maintained within the range from 95° to 100° C. Measurements of the film (TD) thickness, taken at 5% intervals across the distance of the sheet, were made after casting, after longitudinal stretching, and after the final transverse direction stretching operation. Table I, found below, contains a tabulation of the variation in gauge (thickness) of the two films taken after the casting step, the first direction stretch, and the second direction stretch. From the data presented, it can be seen that two-way stretched film (3× in both directions) produced according to the process of the present invention showed considerably less gauge variation, as measured across the film, than did the stretched film produced from a flat-cast film. The transverse direction (TD) gauge variation of the two-way stretched contoured sample was about 6.1% as compared with approximately 24% found in the two-way stretched sample prepared from the flat-cast film. This TD gauge variation was calculated by taking (Table I) the point of greatest thickness, as measured across the width of the film at 5% intervals, and subtracting from it the point of least thickness. The difference between these two points was then divided by the average thickness to give percent gauge variation.

Table I

| Percent Distance Across Sheet | Thickness (Mils) | | | | | |
|---|---|---|---|---|---|---|
| | Cast | | 1-Way Stretched (3×) | | 2-Way Stretched (3×) | |
| | Tapered-Edge Cast Film | Flat-Cast Film | Tapered-Edge Cast Film | Flat-Cast Film | Tapered-Edge Cast Film | Flat-Cast Film |
| 5 | 70.1 | 73.3 | 34.5 | 33.2 | 8.3 | ---- |
| 10 | 72.1 | 74.5 | 32.7 | 30.1 | 8.4 | 8.6 |
| 15 | 73.3 | 74.5 | 32.6 | 28.6 | 8.0 | 8.3 |
| 20 | 73.9 | 73.9 | 32.2 | 27.9 | 7.9 | 8.0 |
| 25 | 74.4 | 72.9 | 32.3 | 2.77 | 8.0 | 7.9 |
| 30 | 74.8 | 72.7 | 33.1 | 27.6 | 8.1 | 7.7 |
| 35 | 74.8 | 72.4 | 32.4 | 27.4 | 8.3 | 7.4 |
| 40 | 74.9 | 72.8 | 32.5 | 27.3 | 8.1 | 7.5 |
| 45 | 75.0 | 72.9 | 32.2 | 27.1 | 8.0 | 7.1 |
| 50 | 75.3 | 72.8 | 31.5 | 26.9 | 8.1 | 7.1 |
| 55 | 74.8 | 72.5 | 31.2 | 27.0 | 8.2 | 7.2 |
| 60 | 74.3 | 73.1 | 30.7 | 27.3 | 8.1 | 7.2 |
| 65 | 73.9 | 73.5 | 30.5 | 27.4 | 8.1 | 6.9 |
| 70 | 73.0 | 73.9 | 30.7 | 27.3 | 8.1 | 6.8 |
| 75 | 73.4 | 73.8 | 31.4 | 27.8 | 8.1 | 6.8 |
| 80 | 72.5 | 74.0 | 31.7 | 28.0 | 8.1 | 7.2 |
| 85 | 70.8 | 73.5 | 32.8 | 28.1 | 8.1 | 7.9 |
| 90 | 70.8 | 72.7 | 33.4 | 28.1 | 8.4 | ---- |
| 95 | 76.1 | 72.6 | 34.5 | 29.9 | 8.4 | ---- |
| Average | | | 32.5 | 27.6 | 8.2 | 7.5 |

| Avg. TD Gauge Variation | Flat Cast, percent | Tapered-Edge Cast, percent |
|---|---|---|
| One-Way Stretched | 23 | 12.3 |
| Two-Way Stretched | 24 | 6.1 |

EXAMPLE 2

Two more samples of polyethylene terephthalate film were prepared as specified in Example 1. The first sample, cast according to the process of the invention (see Figure 2), was 20¾" wide and 0.010" thick. As in Example 1, in the case of the tapered-edge contour cast film, this refers to the thickness at the center. The second cast film, with a flat contour, was 21½" wide and 0.010" thick. Both samples after casting were processed substantially identically in a manner described in Example 1. In this example, in the longitudinal stretching step, the slow rolls were positively driven at a speed of 16.6 yards per minute; and the fast rolls were driven at a speed of 50 yards per minute. The distance between adjacent slow rolls and adjacent fast rolls was 4". The distance between the circumferences of the last slow roll and the first idler roll, the last idler roll and the first fast roll, and between adjacent idler rolls was 0.020″. During longitudinal stretching under the conditions specified, the film was reduced in width (owing to neck-in) by about 17%. Table II below contains a tabulation of the variation in gauge (thickness) of two films after the casting step, the first direction stretch, and the second direction stretch. From the data presented, it can be seen that two-way stretched film (3× in both directions) produced according to the process of the present invention showed considerably less gauge variation, as measured across the film, than did the stretched film produced from a flat-cast film. The transverse direction (TD) gauge variation of the two-way stretched contoured sample was about 22% as compared with approximately 34% found in the two-way stretched sample prepared from the flat-cast film.

*Table II*

| Percent Distance Across Sheet | Thickness (Mils) | | | | | |
|---|---|---|---|---|---|---|
| | Cast | | 1-Way Stretched (3×) | | 2-Way Stretched (3×) | |
| | Tapered-Edge-Cast Film | Flat-Cast Film | Tapered-Edge Cast Film | Flat-Cast Film | Tapered-Edge Cast Film | Flat-Cast Film |
| 5 | 9.7 | 9.7 | 3.3 | 4.3 | 0.89 | 0.93 |
| 10 | 9.1 | 9.5 | 3.1 | 3.9 | 0.82 | 0.94 |
| 15 | 9.3 | 9.5 | 3.2 | 3.8 | 0.86 | 0.88 |
| 20 | 9.6 | 9.6 | 3.3 | 3.7 | 0.89 | 0.83 |
| 25 | 9.5 | 9.5 | 3.1 | 3.5 | 0.84 | 0.84 |
| 30 | 9.4 | 9.5 | 3.1 | 3.3 | 0.82 | 0.82 |
| 35 | 9.6 | 9.5 | 3.2 | 3.2 | 0.84 | 0.80 |
| 40 | 9.7 | 9.5 | 3.2 | 3.2 | 0.85 | 0.76 |
| 45 | 9.6 | 9.4 | 3.1 | 3.1 | 0.85 | 0.74 |
| 50 | 9.5 | 9.4 | 3.0 | 3.0 | 0.80 | 0.73 |
| 55 | 9.6 | 9.3 | 3.1 | 3.0 | 0.81 | 0.73 |
| 60 | 9.7 | 9.2 | 3.2 | 3.2 | 0.83 | 0.72 |
| 65 | 9.7 | 9.1 | 3.2 | 3.0 | 0.83 | 0.70 |
| 70 | 9.6 | 9.2 | 3.2 | 3.0 | 0.86 | 0.69 |
| 75 | 9.7 | 9.2 | 3.2 | 3.2 | 0.89 | 0.74 |
| 80 | 9.5 | 9.3 | 3.3 | 3.3 | 0.88 | 0.78 |
| 85 | 9.2 | 9.2 | 3.4 | 3.4 | 0.89 | 0.79 |
| 90 | 9.0 | 9.2 | 3.5 | 3.6 | 0.89 | 0.85 |
| 95 | 8.9 | 9.2 | 3.6 | 4.1 | 0.99 | 0.96 |
| Average | | | 3.2 | 3.3 | 0.86 | 0.80 |

| Avg. TD Gauge Variation | Flat Cast, percent | Tapered-Edge Cast, percent |
|---|---|---|
| One-Way Stretched | 40 | 19 |
| Two-Way Stretched | 34 | 22 |

In comparing the data obtained from the foregoing examples, it is evident that the process of the present invention shows the greatest improvement when applied to thicker films, i.e., greater than 10 mils in thickness (as cast). This should not be construed, however, as limiting the application of the present process to forming the relatively thicker films.

Polyethylene terephthalate film, in the uniform calipers produced by following the present process, is a highly useful and versatile material, and it may be used in a large variety of applications. Owing to its outstanding strength and toughness, it can be used in calipers as low as 0.00025″ and in widths as narrow as 0.25″. On the other hand, the films are transparent and of high clarity in calipers up to 0.005″–0.010″ and greater. Included among the general and many specific uses for polyethylene terephthalate film are the following: general wrapping and packaging of items such as rice, dried beans, sugar, coffee, fresh produce, cigars, cigarettes, pipe tobacco, soap powders, cement, automobile tires, textiles, greased and untreated machine parts, hardware, gift and novelty items, etc.; packaging of articles to be sterilized such as medicaments, instruments, chemicals, ointments, gauze, bandages, and the like; packaging of foodstuffs which may be heated or cooked in the package or container made from the film, such as hamburgers, frankfurters, popcorn, frozen pies, cakes, bakery products, red meats, squash, cranberries, peas, green beans, etc.; glass replacement for storm, greenhouse and chicken house windows; as a construction material from which animal cages, e.g., rat cages, dog houses, may be fabricated; polarizing film for a great number of light polarizing apparatus and structures, e.g., for automobile headlights and windshields; windshields for motorcycles and small airplanes; windows for containers and envelopes; transparent cans; container and bottle cap liners, e.g., in the form of laminations to paper, cardboard, metal, liners for pressure cylinders fabricated from resin/fiber compositions, etc.; laminations with metal foil to give metallic effects in fabrics; laminations of metallized film to metals, wood, fabrics, paper, thermoplastic films, leather, etc.; laminations with wood, paper, other types of thermoplastic films (vinyl films), leather or fabrics for such uses as protective coverings for pictures, book covers, wall protectors around light switches, as a decorative shoe upper, umbrella coverings, raincoats and hats, place mats, etc.; as a wallpaper material in clear, pigmented or printed form; in millinery applications, for example, in braid form, either alone or laminated to another film of a different color; metallic yarn; conveyor belts or power transmitting belts in unsupported form or laminated to fabrics; in rope and belt structures which may be fabricated by twisting and/or braiding ribbons of the film; tear tapes for packages, i.e., cigarette packages; as the base material for pressure sensitive tapes and adhesive tapes of all varieties; surgical tape; various electrical applications such as slot insulation for motors, small coil insulation in the form of metal laminations for telephone or radio equipment, primary insulation for heat-resistant wire, primary insulation for transformers, magnet wire insulation, pressure sensitive electrical tape, split mica insulating tape, i.e., mica sheets laminated to the film, small condensers, i.e., metal foil laminated to film, as a laminate with paper to obtain a dielectric of improved physical and dielectric strength, weather-resistant electrical wire, i.e., a conductor wrapped with film and coated with asphalt, film laminated to asbestos paper for slot liners, and as a wrapping for submerged pipe to insulate against ground currents; as a thermal insulating material either alone or in combination with conventional thermal insulating materials such as glass fiber batts, cork sheets; as a protective covering for thermal insulating materials; as a sound insulating material or as a protective and/or decorative surface for acoustic tile; sound recording discs, tapes and magnetic tapes; tapes for replacing metal straps for holding cartons together or in palletizing; plastic binder for strengthening non-woven fabrics; tapes for supporting aneurysms; tear tapes for cardboard cartons; parting sheets for low pressure laminating; fabric replacement for garment bags, shoulder covers, etc.; sails for sailboats and skin material for canoes and small boats; tubing or piping for replacing metal or glass piping in various applications, such tubing being formed by lap or butt welding continuous strips of the film to form a cylindrical structure or by rolling flat sheets of film to form cylindrical structures; as a paint replacement for protecting outdoor surfaces; as a protective covering for metals, e.g., auto bodies, before stamping; protective devices such as face shields, goggles, etc.; as a base film for metallizing by sputtering, vacuum deposition techniques or other suitable techniques of applying an adherent metal coating; as an aircraft skin material; as a photographic film base for black and white or color photographs; as a base material in silk screen printing; bacteriostatic applications for inhibiting mold growth, mildew or bacteria growth; as a protective covering on boat bottoms, i.e., may be peeled and replaced; as a protective shatterproof covering for flash bulbs, fluorescent light tubes, milk bottles, and other various types of glass or brittle plastic containers; as a dielectric in electroluminescent lamp structures; as a safety glass interlayer; as building construction panels in the form of multiple films in frames; as a barrier against diffusion of various gases, e.g., against diffusion of dichlorodifluoromethane; as a highway windbreak material; in air filters as the filter medium in the form of shredded film or interlaced ribbons of film; as a lining for concrete tanks; as an outside or inside liner for plastic and metal piping; metal-to-film laminations for tank or container linings; as a base sheet for deep drawing or forming and shaping operations; as a cross-laminated structure of one-way stretched sheets employing a pigmented or colored adhesive for use in fabrication of window shades, awnings, etc.; in laminations with other deformable (rubber-like) plastic materials; in laminations with heat-setting resins to wood, paper, metal and other materials to form protective and decorative surfaces on structural materials or general building materials; for flashings, barrier material, e.g., termite shield, rain gutters and downspouts; as a base material in the form of thin strips or use as a substitute for rattan in chairs, rugs, seat covers, decorative panels, drapes, etc.; as a substitute for impregnated fabrics for use in bellows; as a floor covering in unsupported form or laminated to a fibrous backing; expansion joints, pump and instrument diaphragms, gaskets, rupture discs, etc.; luminous ceilings; as a substitute for metal screening material, this structure being formed from film by perforating the film and stretching the film in one or two directions to form a lattice or net-like structure; as a material of construction for high altitude balloons; as a base for an abrasive sheet (sandpaper); as a base sheet for use by nurseries for covering newly seeded beds for the purpose of retaining ground moisture and protection against frost and attack by birds; as a base material for washers and gaskets of all sizes; as a protective covering for shotgun shells; as a base material for fabricating contour maps; shelf linings; as a page material for Braille books for the blind; as a material of construction for fabricating air ducts in home heating and air conditioning systems; and as a base material in a large variety of such specific applications as playing cards, greeting cards, milk bottle hoods, as primary bottle covers, drinking straws, tying ribbons, crinkled film for decorative uses, tracing cloth, carbon paper, stencils, display and picnic dishes, disposable protectors against war gases, showcase covers, floors for tents, glazing for tent windows, printed charts, nomographs and scales, transparent measuring tapes, umbrellas, raincoats, file folders, refrigerator bags, tobacco pouches, snare and base drum heads, tops for convertible automobiles, covers for automobiles in shipment and storage, display card holders, ticker tape, bottle caps, window shades, labels for reusable bottles, scouring pads fabricated from thin strips or shredded film, identification bracelets, crinkled film as a decorating material or decorative wrapping material, and as a minor bearing surface in various apparatus.

When the film has been stretched in one direction or has been stretched to different extents in two directions, the film is capable of shrinking upon application of heat; and in such form, the film is useful in a large variety of applications such as for heat-shrinkable bands for beverage and food containers of all types, e.g., bottles for containing wines, liquors, softdrinks, fruits, jellies, sea foods, chemicals, pharmaceuticals, etc.; protective coverings for golf club handles, tennis racket handles, lamp shades; as protective shatterproof coverings for flash bulbs, and glass items of all varieties, such as fluorescent light tubes and pressure bottles; protective coverings for dry cell batteries; heavy duty tapes and belts made by cross-laminating one-way stretched film; cordage structures; as a means of holding together a multiplicity of packages (bundling applications), for example, holding together a multiplicity of cigarette packages, small boxes of cereals, crackers, beer cans, etc.; as a heat-shrinkable tape for tight wrapping, e.g., securing items to a shaft or mandrel; and for general wrapping and packaging of fresh and frozen poultry, sausage, smoked hams, frozen fish, irregularly shaped food products and individual servings of loose items such as crackers, nuts and cereals.

Polyethylene terephthalate film in unoriented or oriented form may be deep drawn or shaped into a variety of items such as automobile body parts (fenders, hoods, etc.), baby bassinets and bathinets, battery cases, bases for printed electrical circuits, structures for insulating coils in television sets, containers for food and non-food items, protective caps, chair seats, chassis for radios and like, clothes hampers, dashboard panels for automobiles and airplanes, fender well liners for automobiles, end caps for capacitors, filing baskets and drawers, furniture components, helmets and helmet liners, highway signs and markers, housings for small machines, motors and similar equipment, clocks, lighting fixtures, drum liners and formed liners for other types of containers, phonograph records, piping, portional food cups for individual servings of butter, jellies, cheese, etc., refrigerator parts such as trays, drip pans, door liners, inner walls, etc., butter molds and ice cream molds, shell casings, tanks and tank liners for handling various types of corrosive fluids, tote boxes, toys, trays, e.g., airline food service trays, aircraft glazing, ball bearing separators, wall tile, wash basins, watch and clock crystals, wooden heel coverings, small animal cages, food containers for vacuum packaging and containers where food is directly heated or cooked in the container, squeeze bottles, milk containers shaped in the form of a tetrahedron, and contour maps.

We claim:

1. The process which comprises continuously casting substantially amorphous polyethylene terephthalate between suitably spaced and shaped extruder lips to form a continuous, substantially symmetrical film which has its maximum thickness at the center portion of the film, measured along the transverse axis of the film, and which tapers down at each edge portion of the film, the width of each tapered edge portion constituting at least 15% of the total width of the film, and thereafter continuously stretching said film longitudinally over and on closely spaced stretching rolls, whereby to produce a stretched film of substantially uniform thickness.

2. The process which comprises continuously casting substantially amorphous polyethylene terephthalate between suitably spaced and shaped extruder lips to form a continuous substantially symmetrical film which has its maximum thickness at the center portion of the film, measured along the transverse axis of the film, and which tapers down at each edge portion of the film, the width of each tapered edge portion constituting from about 15% to about 20% of the total width of the film, and thereafter continuously stretching said film longitudinally over and on closely spaced stretching rolls, whereby to produce a stretched film of substantially uniform thickness.

3. The process which comprises continuously casting substantially amorphous polyethylene terephthalate between suitably spaced and shaped extruder lips to form a continuous substantially symmetrical film which has its maximum thickness at the center portion of the film, measured along the transverse axis of the film, the width tapers down at each edge portion of the film, the width of each edge portion constituting from about 15% to about 20% of the total width of the film, and which has a minimum thickness at the edge which is from about 91% to about 92% of the maximum thickness of the film, and thereafter continuously stretching said film longitudinally from 2 to 4 times its original length over and on closely spaced stretching rolls maintained at a temperature within the range of from 80° to 90° C., whereby to produce a stretched film of substantially uniform thickness.

4. The process of claim 3 wherein the said maximum thickness is at least 10 mils.

(References on following page)

References Cited in the file of this patent
UNITED STATES PATENTS

| | | |
|---|---|---|
| 1,952,038 | Fischer | Mar. 20, 1934 |
| 2,083,557 | Crane et al. | June 15, 1937 |
| 2,168,288 | Fischer | Aug. 1, 1939 |
| 2,412,187 | Wiley et al. | Dec. 3, 1946 |
| 2,497,376 | Swallow et al. | Feb. 14, 1950 |
| 2,760,227 | Andy | Aug. 28, 1956 |
| 2,823,421 | Scarlett | Feb. 18, 1958 |